O. O. ADAMS.
DIRECTION INDICATOR FOR MOTOR DRIVEN VEHICLES.
APPLICATION FILED OCT. 13, 1919.

1,383,181.

Patented June 28, 1921.

INVENTOR.
O. O. Adams,
BY
Hazard & Miller
ATTORNEYS.

UNITED STATES PATENT OFFICE.

OTTO O. ADAMS, OF LOS ANGELES, CALIFORNIA.

DIRECTION-INDICATOR FOR MOTOR-DRIVEN VEHICLES.

1,383,181. Specification of Letters Patent. Patented June 28, 1921.

Application filed October 13, 1919. Serial No. 330,423.

*To all whom it may concern:*

Be it known that I, OTTO O. ADAMS, a citizen of the United States, residing at Los Angeles, in the county of Los Angeles and State of California, have invented new and useful Improvements in Direction-Indicators for Motor-Driven Vehicles, of which the following is a specification.

This invention relates to signal apparatus and more particularly to direction indicators for motor vehicles.

The invention has for its object to provide a simple, inexpensive and compactly organized form of signal device that is capable of being readily applied in a position on the rear of the vehicle so as to be clearly viewable, and has further for its object to provide means for indicating the intended control of the vehicle, as for instance to show that the machine is to be turned to the right, or to the left, or to be stopped, and further to provide a device of this kind which will act semi-automatically to bring the signal apparatus to a normal position at which the signal display device forms a tail-light signal.

With the above and other objects in view as will be rendered manifest to those versed in the art, the invention consists of the construction, the combination, and in details and arrangements of the parts as more particularly set forth hereinafter relative to the embodiment of the invention illustrated in the accompanying drawings, wherein.

Figure 2:
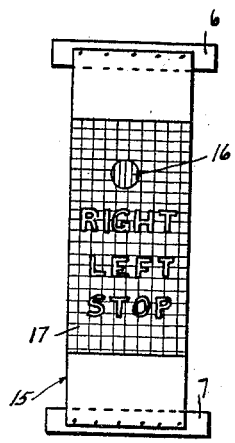
Fig. 2 is a plan view of the fully extended curtain attached to its carrying rollers.
Figure 1:
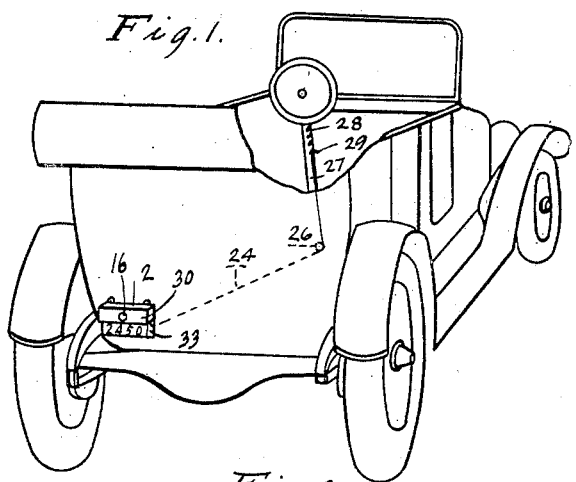
Figure 1 is a perspective view of an automobile to which the device is applied.
Figure 3:
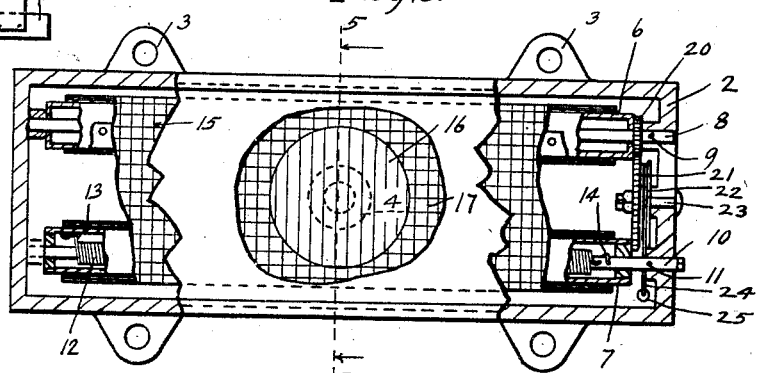
Fig. 3 is an elevational view partly broken away and with certain of the parts in section to illustrate clearly the construction.
Figure 4:
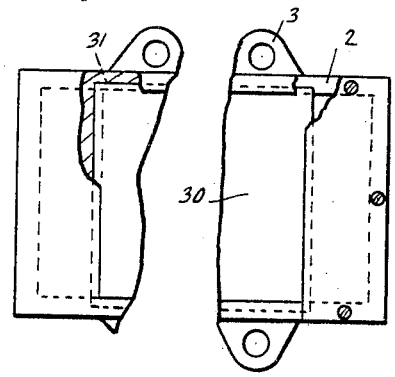
Fig. 4 is an elevational view of the broken away casing showing the method of mounting a window therein.
Figure 5:
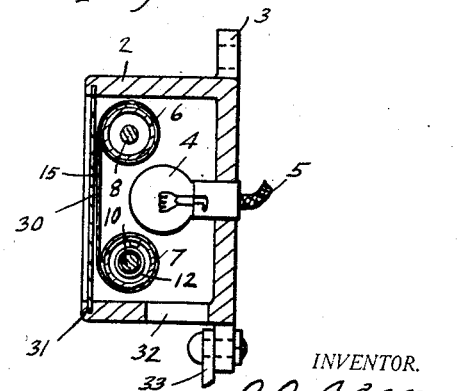
Fig. 5 is a section on the line 5—5 of Fig. 3.

In the illustrated embodiment of the invention the apparatus includes a casing or housing 2 of suitable dimensions and proportions and is herein shown as substantially rectangular in plan and in cross section and preferably in integral form for simplicity and cheapness of manufacture. The top and bottom rear edges of the housing may be provided with fastening lugs 3 to receive bolts or screws or other fastening means whereby the housing can be efficiently secured to a suitable mounting upon the automobile, as for instance as being attached to the rear of the body thereof.

One longitudinal side of the casing is left open to form a passage way for the rays of light from a suitable source as the electric bulb 4 therein which may be supplied with the electric current through connections 5 attached to suitable source of electricity. The electric bulb is mounted in this casing somewhat to the rear of and intermediately between the upper and lower rollers 6 and 7, the former of which is loosely mounted on a rod or journal 8 suitably secured as by a pin 9 in bearings therefor, the rod being readily removable endwise from one end of the casing 2 by the removal of the fastening device 9, and this, therefore, readily permits the removal of the upper roller 6 outwardly through the open front of the casing 2. The lower roller 7 is also loosely mounted on a supporting journal or rod 10 removable endwise through the end of the casing and preferably held in fixed position by a key or suitable fastening device 11 so that the roller 7 may be removed in a manner similar to the roller 6.

Preferably one of the rollers is of a self-winding or spring type and in this case the lower roller is connected to one end of the winding spring, in the present case shown as a helix 12 one end of which is shown at 13 connected to the roller 7 which is hollow and incloses the spring 12 which is coiled about the supporting rod 10 to which the other end of the spring is connected at 14. The ends of a flexible member or curtain 15 are connected in any suitable manner to rollers 6 and 7, and under normal conditions the greater portion of this flexible member or curtain is wound on to the spring actuated roller 7. The greater portion of this flexible member or curtain is formed of substantially opaque material, but a centrally arranged portion near one end or that end that is connected to roller 6 is formed of translucent material, said portion being designated by the numeral 16, and under normal conditions this translucent portion occupies a position directly in front of the lamp 4, and said translucent portion is preferably colored red.

When this red portion 16 is maintained in a position in front of the light bulb 4 it will serve as the usual tail light of the vehicle. In successive progression longitudinally along the curtain 15 other suitable signal portions are provided, these being indicated at the words "Right"—"Left"—and "Stop."

As hereinbefore stated the greater portion of the curtain is made opaque this being indicated by the cross lining or shading 17. Those portions of the curtain that are occupied by the letters forming the words above quoted are formed of transparent or translucent material so that the light will readily pass through the letters forming the signal words to indicate to persons in the rear of the vehicle the intended control of the vehicle. Obviously, the curtain 15 may be made of any suitable material and may be of any desired color as the exigencies may require.

For the purpose of varying or changing the signal to be exhibited by the device and arranged over the bulb, a suitable mechanism is provided herein shown as including a pinion 20 which is rigid with the upper roller 6, the pinion engaging a master gear 21 on one side of which is formed or attached a pulley 22, the same being loosely mounted on a stud bearing 23. A cord or other suitable controlling element is attached to the pulley, the cord being indicated at 24 and shown as led through a guide hole 25 and from thence suitably along the body of the vehicle or through the same to and over appropriate guide means as a pulley 26 from which it is led upwardly, in the present case, along the steering post 27 of the vehicle and to which is attached a series of fixed supports in the form of pins, hooks or buttons 28 any of which may be selectively engaged by a ring or eye 29 in the end of the controlling rod 24. In this manner the operator of the vehicle has but to detach the fastening device 29 from one of the fixed members 28 and permit the rewinding of the curtain 15 as may be required to indicate the desired signal thereof which will show through the open side of the box and which preferably is covered by a transparency indicated at 30 and which may be readily inserted into and removed from grooves 31 provided therefor in the walls of the casing 2.

The object of providing the gear mechanism above referred to is so as to secure a multiplication of the movement of the ribbon or curtain 15 by a minimum degree of movement of the controlling, or fastening, or retaining device 29.

If desired the lower side of the casing 2 may be provided with a window opening 32 to permit rays of light to pass downwardly and play upon the surface of the license number plate which is indicated at 32 which may be attached to or adjacent to the indicating device so that the one source of light at the bulb 4 may be utilized both for the direction indicator and for the license plate 33.

Various changes may be made without departing from the spirit of my invention as claimed.

I claim:

1. A direction indicator for automobiles comprising a casing attachable to a suitable part of the vehicle so as to be clearly removable from the rear thereof; a spring roller mounted in the casing, a companion roller also in the casing, a curtain connecting the rollers and normally wound on the spring roller, portions of said curtain being translucent in order to form signaling indicia; and mechanism operable manually to turn the companion roller against the spring roller action, said mechanism including a flexible device attachable selectively to one of a series of stationary supports so as to hold the curtain to display a desired part thereof.

2. A direction indicator for automobiles, comprising a curtain of generally opaque material and having translucent portions with different signals, a pair of winding rollers to which the curtain is attached, means normally tending to wind the curtain in one direction on one of the rollers, and a manually controlled device for restraining the said winding movement and for operating the other roller to vary the indicating signal, said device including a master gear having a control element extended to an operator's station, and a pinion engaged thereby and rigid with the setting roller whereby a multiplied movement is secured.

In testimony whereof I have signed my name to this specification.

OTTO O. ADAMS.